United States Patent [19]

Würsch et al.

[11] Patent Number: 4,853,248

[45] Date of Patent: Aug. 1, 1989

[54] FOOD PRODUCT OF LEGUMINOUS SEEDS AND PROCESS FOR MAKING IT

[75] Inventors: Pierre Würsch, La Tour-de-Peilz, Switzerland; Francois Musso, Pontarlier; Eric Goulois, Beauvais, both of France

[73] Assignee: Nestec S.A., Vevey, Switzerland

[21] Appl. No.: 122,550

[22] Filed: Nov. 13, 1987

Related U.S. Application Data

[63] Continuation of Ser. No. 795,980, Nov. 7, 1985, abandoned.

[30] Foreign Application Priority Data

Nov. 28, 1984 [CH] Switzerland .......................... 5668/84

[51] Int. Cl.$^4$ ................................................ A23L 1/36
[52] U.S. Cl. ..................................... 426/634; 426/640; 426/648; 426/656; 426/460; 426/457
[58] Field of Search ............... 426/640, 629, 634, 656, 426/457, 459, 460, 464, 461, 473, 648, 645

[56] References Cited

U.S. PATENT DOCUMENTS

| | | | |
|---|---|---|---|
| 3,016,303 | 1/1962 | Cooley | 426/457 |
| 4,204,005 | 5/1980 | Kudo et al. | 426/518 |
| 4,400,402 | 8/1983 | Vibbert et al. | 426/460 |
| 4,407,840 | 10/1983 | Lathrop et al. | 426/640 |
| 4,504,514 | 3/1985 | Kudo et al. | 426/634 |

*Primary Examiner*—Marianne Cintins
*Attorney, Agent, or Firm*—Vogt & O'Donnell

[57] ABSTRACT

Instant dehydrated purees of seeds of leguminous plant with retarded intestinal resorption in the form of flakes or granules are prepared by rehydrating dry seeds of the leguminous plants, cooking the rehydrated seeds, reducing the cooked seeds to a puree and drying the puree by carrying out these steps such that the cell walls of the seeds, particularly the cell walls of the cotyledon, are damaged as little as possible. To prepare the dehydrated puree, dry seeds are rehydrated by soaking and then the rehydrated seeds are cooked, reduced to puree and dried.

24 Claims, No Drawings

FOOD PRODUCT OF LEGUMINOUS SEEDS AND PROCESS FOR MAKING IT

CROSS REFERENCE TO RELATED APPLICATIONS

This is a continuation application of co-pending application Ser. No. 06/795,980, filed Nov. 7, 1985, now abandoned.

BACKGROUND OF THE INVENTIONS

This invention relates to an instant, dehydrated puree of starchy material and to a process for its production.

It is known that the consumption of various starchy materials has a variable effect upon glycaemia (glucose content of the blood) and on insulinaemia (insulin content of the blood), according to their digestibility which is influenced, in particular, by their method of preparation and cooking and by the nature of their starch. It is known in particular that starch from the seeds of leguminous plants can show retarded, dietetically useful digestibility compared with starch from other starchy materials, such as cereals or potatoes, for example. However, it is also known that this desirable property of the starch from leguminous plant seeds may be lost depending on how they are prepared and cooked, particularly if they are ground before being cooked.

It is also known that a structured product may be made by preparing a puree or aqueous paste of fruits, vegetables and/or cereals, particularly potatoes, wheat or peas, by drying the puree on a drum, removing a film from the drum and stacking numerous layers of that film to form a laminate. However, this known process is designed to produce a potato laminate capable of replacing a dough based on wheat flour in culinary specialities, such as lasagne or patties, for example.

It is also known that instant, dehydrated potato purees or cereal gruels can be prepared in the form of flakes by drying on drums. However, this technology has not been extended to include the treatment of leguminous plants.

It is also known that an instant, dehydrated potato puree can be prepared in the form of granules by a drying process in which the puree to be dried is mixed with a recycled quantity of partly dried puree. However, this technology has not been extended to include the treatment of starchy materials other than potatoes.

Finally, it is known that instant, dehydrated whole seeds of leguminous plants can be produced by a process comprising the steps of soaking, cooking, impregnation with a calcium-complexing agent, freezing and drying. The instant property of the leguminous plant seeds thus prepared does appear to be obtained in this way, but the process is complicated.

In other words, the fact that processes for producing dehydrated purees in the form of flakes or granules have not really been extended to the treatment of seeds of leguminous plants would appear to indicate that they are not suitable for that application. This is confirmed by the fact that the known instant seeds of leguminous plants are presented in whole form. In addition, since the dietetically useful property of retarded digestibility of starch from the seeds of leguminous plants can be lost if an unsuitable method of preparation and cooking is selected, there appears nothing to commend the idea of preparing an instant, dehydrated puree of seeds of leguminous plants.

SUMMARY OF THE INVENTIONS

The object of the present invention is, precisely, to provide an instant, dehydrated puree of seeds of leguminous plants of which the starch has substantially the same retarded digestibility as that of the whole, carefully cooked seeds.

Another object of the present invention is to provide a simple process for producing this puree which leaves the starch with its property of retarded digestibility.

The instant, dehydrated puree of starchy material according to the invention is thus characterized in that the starchy material is the seed of a leguminous plant and in that it has a digestion index below 30.

The seeds of the leguminous plants are preferably selected from the group comprising beans and lentils.

The instant, dehydrated puree may consist of granules or flakes.

The process for producing an instant, dehydrated puree of starchy material according to the present invention is characterized in that the dry seeds of leguminous plants are soaked, cooked and reduced to a puree and the puree is dried.

It has surprisingly been found that an instant, dehydrated puree may thus be prepared without difficulty from seeds of leguminous plants whilst substantially retaining the property of retarded digestibility of their starch. More particularly, it has been found that this property may be better retained if the individual steps of the process are carried out in such a way that the cell walls of the seed or, more precisely, the cell walls of the cotyledon, are damaged as little as possible.

In the present specification, the digestibility of the starch is characterized by a "digestion index". This digestion index is determined by a hydrolysis test of the starch in vitro for 1 hour using trypsin and pancreatin under specific conditions which will be described hereinafter.

This is because it has been found that there is a close correlation between the digestion index, thus determined, and the in vivo digestibility of the starch characterized by a "glycaemic index".

This glycaemic index is determined by integration of a curve showing the development of glycaemia, i.e., the glucose content of the blood, in the first hour after consumption of the starch. The precise conditions under which this curve is established are described hereinafter.

In the context of the present invention, the expression "instant, dehydrated puree" means that the puree is in dehydrated form and that it may be reconstituted simply by adding water at approximately 80° to 100° C. and stirring gently.

Similarly, the notion of "gelatinization of the starch" is to be understood as the loss of the birefraction of the starch under the effect of heating and absorption of water.

Finally, the expression "dry seeds of leguminous plants" applies to seeds of leguminous plants which have been dried after gathering in readiness for sale, this drying generally being carried out naturally with air. Seeds such as these generally have a residual water content of around 8 to 14% after having lost about half their total initial weight during the drying process.

Now, it has been found that the process according to the invention allows an apparently paradoxical objective to be achieved, namely, the production of an instant, dehydrated puree of leguminous plants of which the starch retains its property of retarded digestibility whilst being almost completely digestible, i.e., completely assimilable by the organism.

DESCRIPTION OF PREFERRED EMBODIMENTS

Any commercially available dry seed of a leguminous plant may be used as starting material for carrying out the process according to the invention, although it is preferred to use dry beans or lentils.

The dry seeds are preferably soaked in soft water having a Ca content of no more than 3 mmoles/l. It has been found that the enrichment of sodium chloride, for example, in the soaking water has rather adverse effects on the leguminous plant seed in the present case. In particular, it is advisable to avoid any increase in pH or in the salinity of the soaking water which would have the effect of extracting the proteins or of weakening the cell walls of the seed. Water may be used in a quantity of approximately 2 to 4 parts by weight to 1 part by weight of dry seeds, for example.

The object of soaking is to obtain a maximum degree of rehydration, i.e., a water content of the soaked, dry seed close to the water content of the fresh seed at the height of its growth. The quantity of water which may thus be absorbed in the interstitial tissues of the seed around the grains of starch is sufficient to permit complete gelatinization of the grains during cooking and, hence, to ensure their maximum digestibility. To this end, the seeds may be soaked for 0.5 to 24 h at a temperature of from 20° to 65° C.

If the seeds are soaked at ambient temperature, i.e., at a temperature of approximately 20° to 22° C., the desired result may be obtained in approximately 10 to 24 hours. If they are soaked for less than 10 h, the seeds may not become tender enough. If the seeds are soaked for longer than 24 h, the risks of microbial growth are unnecessarily increased without any significant improvement in the result of soaking.

If the seeds are soaked in heated water to accelerate the process, it is preferred to avoid causing gelatinization, i.e., the absorption of interstitial water by the starch grains themselves, to begin at this stage. Accordingly, it is preferred to avoid soaking at temperatures above 65° C. Similarly, it is preferred not to prolong the soaking time beyond the necessary time which may only be, for example, approximately 0.5 to 4 h at temperatures of the order of 40° to 65° C. and which depends on the physical characteristics of the seeds, particularly their surface-to-volume ratio.

The primary object of cooking the seeds of leguminous plants is to obtain complete gelatinization of the starch grains. During this cooking operation, it is preferred in the present case to ensure that the starch grains only absorb the water present in the interstitial tissues after the soaking process so as to avoid unnecessary swelling of the starch grains and distension of the cell walls of the seed. Accordingly, the seeds are preferably cooked with saturated steam at atmospheric pressure. Although the seeds may also be cooked with water, it is difficult in that case to obtain uniform cooking of the seeds without having to maltreat them by stirring. In addition, if the seeds are cooked in water, it is also difficult to prevent the starch grains from swelling beyond the level necessary to obtain their complete gelatinization. Cooking with steam under pressure is also possible.

The cooking time should be long enough for the seed of the leguminous plant to lose its typical raw seed taste, the disappearance of that taste generally coinciding with the complete gelatinization of the starch. However, the cooking time may have to be prolonged by a few minutes, for example, to obtain a tenderness of the seed which enables it to be adequately reduced to puree. Thus, the cooking time is of the order of 40 to 60 minutes, particularly in the preferred method of cooking with saturated steam at atmospheric pressure. If the seeds are cooked for less than 40 minutes, complete gelatinization of the starch may not be obtained and the raw taste may persist. If the seeds are cooked for longer than 60 minutes, no significant increase in the digestibility of the starch is obtained whilst, at the same time, the seed is tenderized beyond the necessary level, thus unnecessarily weakening the cell walls. This range of approximately 40 to 60 minutes is applicable to operations at altitudes equal to or relatively close to sea level, where the boiling temperature of water is approximately 98° to 100° C. For working at higher altitudes, the cooking time may be prolonged to compensate for the reduction in atmospheric pressure.

Cooking with steam may be carried out in any suitable apparatus or machine which does not maltreat the seeds, i.e., which does not subject them to any mechanical stresses. It is possible to use, for example, a direct steam conveyor-belt blancher in which the seeds are arranged in a relatively thin layer to avoid irregularities in cooking. Before reducing the cooked seeds to puree and even during cooking, it may be of advantage to provide for the seeds to drain so that they do not stagnate in the water of condensation of the steam used for cooking.

The cooked seeds may be reduced to puree using any suitable machine which is capable of breaking the cooked seeds and of disintegrating them by the application of relatively gentle contracting and/or bending forces excluding, if possible, shearing and/or twisting forces. A machine such as this is represented, for example by a two-roll mill of which the roll gap is adjusted in such a way that the seeds are just sufficiently compressed to break and disintegrate. Another possible machine is a so-called puree press consisting of a grille or plate formed with holes or openings through which the material to be reduced to puree is pressed, providing the holes are large enough and providing minimum force is applied to the seeds to make them pass through.

Thus, in a preferred embodiment of the operation for reducing the cooked seeds to puree, the cooked seeds are pressed in such a way that they pass at a speed of 2 to 20 cm/s through a plate formed with holes or openings of which the smallest dimension is between the smallest mean dimension and the largest mean division of the soaked seeds. If, for example, cooked lentils having a mean diameter of 5–6 mm and a mean thickness of 2–3 mm are to be reduced to puree, they are passed through a plate formed with round openings 3 to 5 mm in diameter. If smaller openings are used, the seeds are unnecessarily maltreated. If larger openings are used, the seeds will no longer be reduced to puree. Similarly, if the cooked seeds are pressed in such a way that they pass through the openings at a speed higher than 20 cm/s, they are maltreated through the application of excessive forces and, in particular, shearing forces which damage the cell walls. If the cooked seeds are pressed in such a way that they pass through the openings at a speed below 2 cm/s, reduction to puree may still be obtained, but throughput is unnecessarily slowed down to no significant advantage. The seeds may be pressed through the openings, for example, by a suitable, slowly rotating conveyor screw with a relatively broad pitch or a piston. Conversely, the plate with the holes may even be made to penetrate through the stationary seeds, for example.

The puree may be dried by any technique capable of quasi-individually drying the constituent granules of the puree. Thick-layer oven drying, for example, is not appropriate because it gives a block of dried puree which then has to be crushed and ground, damaging the cell walls and destroying the qualities of retarded digestibility of the starch. By contrast, the technique of drying with recycling or the technology of drying on a drum may be successfully used for carrying out the process according to the invention.

Thus, the dehydrated puree according to the invention may be obtained in the form of granules by drying the puree by successive operations of mixing with a first recycled fraction of partly dried puree, partial drying of the mixture and final drying of a second fraction of partly dried puree. This method is based on the rapid extraction of moisture from the constituent granules of the fresh puree by contact with the constituent granules of the partly dried puree so that the fresh puree does not dry in the form of large aggregates, but instead disintegrates spontaneously into very small individual particles or granules consisting of one or a few substantially intact cells.

The dried puree according to the invention may also be obtained in the form of flakes by drying the puree on a drum, separating a film of dehydrated puree from the drum and reducing the film into flakes. By this method, it is possible rapidly to vaporize the moisture present in the puree when it is in the form of a very thin layer, allowing a loose film of juxtaposed, interconnected granules, each consisting of a few individual substantially intact cells, to be obtained. This film may be broken up and reduced to flakes without an excessive number of cell walls being damaged, providing the flakes retain relatively large dimensions.

To dry the puree on a drum, it is possible to use a dryer comprising two drums of the same diameter or a dryer comprising one drum equipped with at least one planetary roll. The drum(s) may be heated with steam, preferably saturated, at 2-8 bars, the gap between the drums or between the drum and the planetary roll being adjusted to approximately 3-6 mm, the puree being delivered to and distributed over the drum ahead of the gap, the drum being rotated at such a speed that the residence time of the puree on the drum is approximately 8-25 s and the dry film thus formed on the drum may be detached by a scraper applied to the drum. Where a dryer comprising a drum equipped with several planetary rolls is used, the planetary rolls may be fed or charged in a cascade arrangement by successive scrapings or individually with fresh puree.

If the drum is heated with steam under a pressure of more than 8 bars or if the puree is left on the drum for longer than 25 s, there is a risk of no coherent film being formed on the drum and of all the individual granules coming into contact with the scraper being maltreated. If the drum is heated with steam under a pressure of less than 2 bars and if the puree is left on the drum for less than 8 s, the film will not be sufficiently dried.

In order to avoid the risk of a powder being formed instead of a coherent film, particularly in cases where it is desired to increase the quantity of puree dried per hour by heating the drum with steam under a relatively high pressure of from 4 to 8 bars, the surface temperature of the drum may be reduced, for example, to 110-115° C. To this end, water, preferably demineralized water, may be sprayed onto the drum ahead of the zone where puree is distributed over the drum. The water may be sprayed in such a way that a boiling zone appearing on the drum extends to the edge of the zone where the puree is distributed over the drum. In this way, it is possible safely to increase the quantity of puree dried per hour in a proportion of up to 70-90% in relation to the quantities obtained by heating the drum with steam under a relatively low pressure of 2 to 4 bars.

The puree is preferably dried to a residual moisture content of approximately 3-8%. If it is dried to a residual moisture content below 3%, the product is in danger of becoming rancid in storage. If it is dried to a residual moisture content above 8%, the product is in danger of turning brown and taking on a sweet taste in storage in consequence of a Maillard reaction.

If the puree is dried on a drum, the film dried in this way has a weight of approximately 0.5 to 1.5 g/dm$^2$. It may then be reduced to flakes by any method which only produces a minimum of fines because it is important to reduce the film to flakes of appreciable dimensions and not to powder. The film is preferably reduced to flakes having a surface area of at least 4 mm$^2$. To this end, it is possible, for example, to press the film with a rotary brush through a screen having openings of at least 4 mm$^2$.

The instant dehydrated puree according to the invention may be reconstituted, for example, by pouring 2 to 3 parts of hot water onto 1 part of dehydrated puree, depending on the desired consistency, and gently stirring. The water used may have a temperature of from 80° to 100° C., although it is preferred to use water having a temperature at the lower end of that range. By waiting a few minutes, but at most approximately 5 minutes, before consuming the reconstituted puree, it is possible further to improve its organoleptic qualities, particularly its unctuosity. However, if it is left any longer to cool, the reconstituted puree loses some of its organoleptic properties by thickening.

The puree according to the present invention represents a food having a definite dietetic, nutritional and organoleptic interest for consumers in general. By virtue of its retarded digestibility, i.e., its retarded intestinal resorption, the puree according to the invention has the major physiological advantage of providing the desired energy intake whilst maintaining stable glycaemia and insulinaemia levels. Accordingly, the puree according to the invention contributes towards extending the feeling of fullness and of preventing departures from or excesses of diet. Accordingly, its use is thus particularly indicated for consumers desiring to control their appetite and their weight and for obese and/or diabetic patients on strict diets.

The following Examples describe by way of illustration some embodiments of the instant dehydrated puree according to the present invention and the process for its production. They are preceded by a summary of the tests carried out to determine the digestion index and the glycaemic index and by a few Comparison Examples illustrating, on the one hand, the digestibility properties of starch from seeds of leguminous plants prepared and cooked in various ways and, on the other hand, the correlation between the digestion index and the glycaemic index. They are followed by Comparison Application Examples illustrating the effects of consuming the present puree on the glycaemia and insulinaemia of healthy or diabetic individuals.

In all the Examples, the percentages and parts are by weight unless otherwise indicated.

Examples

DIGESTION INDEX (a) Reagents

Phosphate buffer, 20 mmoles/l and pH 7, containing 52 mg of $MgSO_4 \cdot 7H_2O$/l and 70 mg of $CaCl_2 \cdot 2H_2O$/l
trypsin having an activity of 3000 NF per mg
pancreatin having an activity of 4 NF per mg, 30 mg dissolved in 10 ml of buffer
Nelson-Somogyi reagent for reducing sugars (expressed as maltose)
soluble starch (b) Preparation of samples for the digestion test b.1. Puree An amount of instant dehydrated puree equivalent to 700 mg of starch, expressed as glucose, is introduced into a stoppered test tube. 20 ml of buffer are added, followed by heating for 10 minutes at 100° C.

b.2. Flour of leguminous plants for comparison

Dry seeds of leguminous plants are ground into flour. An amount of flour equivalent to 700 mg of starch, expressed as glucose, is introduced into a stoppered test tube. 20 ml of buffer are added, followed by heating for 15 minutes at 115–120° C.

b.3. Seeds of leguminous plants for comparison

A quantity of whole dry seeds of leguminous plants equivalent to 7 g of starch, expressed as glucose, is soaked in 200 ml of buffer for 12 h at 20° C. or for 4 h at 40° C. After heating for 15 minutes at 115–120° C., the seeds are reduced to puree by gentle grinding. 10% of the puree is removed and introduced into a stoppered test tube.

b.4. Soluble starch for standardization

An amount of soluble starch, equivalent to 700 mg of starch expressed as glucose, is introduced into a stoppered test tube.

(c) Test conditions 5 mg of trypsin and 0.15 ml of pancreatin solution are introduced into a test tube heated to 37° C. and thoroughly mixed. Thorough mixing is repeated every 10 minutes. After 60 minutes at 37° C., the test tube is centrifuged and 0.5 ml of solution is collected and diluted in 25 ml of distilled water. 1 ml of the dilute solution is removed and the maltose equivalent content is determined.

(d) Definition of the digestion index

The digestion index is defined as being the percentage of maltose equivalent formed during the test in relation to the initial starch of the sample, expressed as glucose, divided by the percentage of maltose equivalent obtained in this way for the soluble starch and multiplied by 100.

The digestion index is thus standardized in relation to the soluble starch of which the digestion index assumes the value of 100 under this definition.

It is pointed out that approximately 40% of maltose equivalent is formed during the test carried out on the sample of soluble starch, in relation to the initial soluble starch expressed as glucose.

Comparison of the digestion indices of various samples

A.1. Samples of flour from dry seeds of white beans (Phaseolus vulgaris) and brown lentils (Lens esculenta) are prepared and cooked for 15 minutes at 115–120° C. in the manner described in b.2. above.

A.2. Flakes of white beans obtained as described in Example 1 below are ground into flour. A sample of this flour is cooked for 10 minutes at 100° C. in the manner described in b.1. above.

B.1. Samples of whole dry seeds of white beans and brown lentils are prepared and then soaked for 4 h at 40° C. and cooked for 15 minutes at 115° to 120° C. in the manner described in b.3. above.

B.2. A sample of the bean flakes obtained as described in Example 1 below is taken and cooked for 10 minutes at 100° C. in the manner described in b.1. above.

C. The digestion index of all these samples is determined in the manner described in c) and d) above. The indices thus determined are shown in the following Table.

|  | 1 | | 2 Flakes of white beans |
|---|---|---|---|
|  | Brown lentils | White beans | |
| A, Grinding followed by cooking | 67 | 85 | 59 |
| B, Cooking without grinding | 22 | 22 | 17 |

This Table clearly illustrates the rapid digestibility of the starch of the ground and then cooked seeds of leguminous plants which contrasts with the retarded digestibility of the starch of the soaked and cooked whole seeds of leguminous plants. It can be seen that the preparation of the instant dehydrated puree of white beans in accordance with Example 1 allows the qualities of retarded digestibility of the starch to be completely retained whereas, if the flakes are ground, the majority of those qualities is lost. If, after grinding, the digestibility of the starch is not as rapid as that of the starch of the ground and then cooked seeds, this may be attributed to a certain retrogradation of the amylose during the production of the instant dehydrated puree.

Glycaemic Index

A ration of starchy material equivalent to 50 g of starch is given to individuals to consume on an empty stomach. Blood samples are taken 30 minutes before consumption (for control), just before consumption and then 30 minutes, 45 minutes and 60 minutes after consumption. The glucose content of all the blood samples taken is determined. The glycaemia curve (ordinate, mmoles/ml) of the individual is drawn as a function of time (abscissa, h) between the instant O, the moment of consumption, and 1 hour after. The glycaemic index is defined as equal to the surface area between that curve and the horizontal line passing through the glycaemia at the instant O. It is expressed in $mmoles/l \cdot h^{-1}$.

Correlation between the digestion index and the glycaemic index

With the assistance of two healthy individuals, two series of glycaemic indices of whole cooked ground lentils, ground and then cooked brown lentils, flakes of yellow peas obtained incorrectly, flakes of white beans obtained as described in Examples 1 and 2 and flakes of white beans obtained incorrectly, namely after damaging the cooked seeds by kneading in a pump, are determined in the manner described above. The flakes of yellow peas and white beans are reconstituted by addition of 3 parts of water at 80° C. to 1 part of flakes and consumed 5 minutes later. The flakes according to Example 2 below are also tested in ground form, being reconstituted in the same way as the intact flakes.

The digestion index of each of the products is also determined by the method described above.

The results obtained are set out in the following Table.

| Product | Digestion index | Glycaemic index (mmoles/1 · h$^{-1}$) | |
|---|---|---|---|
| | | Individual No. 1 | Individual No. 2 |
| White bean flakes according to Ex. 1 | 17 | 0.36 | 0.57 |
| Whole brown lentils | 22 | 0.42 | 0.30 |
| White bean flakes according to Ex. 2 | 23 | 0.38 | 0.18 |
| Damaged white bean flakes | 30 | 0.68 | 0.71 |
| Damaged yellow pea flakes | 39 | 0.71 | 0.81 |
| Ground white bean flakes according to Ex. 2 | 60 | 1.08 | 1.12 |
| Ground brown lentils | 67 | 1.40 | 1.24 |

It can be seen there is a very clear correlation between the two indices. This correlation justifies the characterization of the qualities of retarded digestibility of the instant dehydrated puree according to the invention solely by the digestion index.

From digestion index values of approximately 30, it is even possible to predict the glycaemic index with a certain accuracy. For digestion index values of approximately 15 to 30, there is little point in predicting the glycaemic index, or only globally, because the corresponding glycaemia is very close to the glycaemia of the fasting individual and is therefore subject to the same variations.

EXAMPLE 1

Dry seeds of white beans (Phaseolus vulgaris) are soaked for 15 h at 20° C. in tapwater having a Ca content of 2 mmoles/l in an amount of 1 part of seeds to 3 parts of water. During this soaking process, the seeds take up approximately 100% of water in relation to their weight before soaking.

The seeds are then placed in a conveyor-belt blancher in a layer approximately 8 cm thick and cooked for 50 mins. with saturated steam at atmospheric pressure. The seeds are drained. They now have a dry matter content of around 45%, an average length of approximately 16 mm, an average width of approximately 9 mm and an average thickness of approximately 5 mm.

Using a conveyor screw having a flight pitch of 10 cm and a diameter of 15 cm, the cooked seeds are pressed through a plate of the same diameter formed with oblong openings 8 mm wide and 90 mm long. The sum total of the surface areas of the openings represents approximately 40% of the surface area of the plate. The screw rotates at approximately 60 r.p.m. The average speed of the seeds in the screw is below the theoretical speed of 10 cm/s because the seeds slide on one another and against the wall of the screw. The seeds pass through the openings in the plate at an average speed of approximately 15 cm/s.

The puree is dried on a drum dryer 50 cm in diameter and 50 cm long equipped with four planetary rolls 9.6 cm in diameter. The first planetary roll is positioned slightly downstream in relation to the vertical plane passing through the axis of the drum. The gap between the planetary rolls and the drum is adjusted to 4 mm. The drum is heated with steam at 2.5 bars and rotates at 3 r.p.m.

The puree is then charged and distributed uniformly over the entire width of the drum ahead of the first planetary roll. The planetary rolls are fed in a cascade arrangement by successive scrapings. The puree remains on the drum for 15 s before being detached in the form of a film by a scraper applied to the drum downstream of the fourth planetary roll. The film has a residual moisture content of 5%.

The film is reduced to flakes in an approx. 16 mm$^2$ mesh sieve through which it is forced to pass under the effect of a light pressure applied by a rotating brush. The flakes obtained, which are creamy white in color, have a surface area of approximately 16 mm$^2$, an apparent density of approximately 0.4 kg/l and a digestion index of 17.

To reconstitute the puree, two to three parts of water at 80° C. are poured onto one part of flakes, depending on the desired consistency. With three parts of water, the consistency of a fluid puree is obtained. With two parts of water, the consistency of a thick puree is obtained. The reconstituted puree has a pleasant and neutral taste. In particular, no astringency can be detected. Its texture is also pleasant in the mouth and is reminiscent of that of a well-prepared cereal gruel when it is squeezed between the tongue and the palate.

EXAMPLES 2-6

Instant dehydrated purees of seeds of various leguminous plants are prepared in the form of flakes in the same way as described in Example 1, except that some of the conditions are varied and adapted.

Examples 2 and 3 are also carried out with seeds of white kidney beans. Examples 4 to 6 are each carried out with seeds of another variety or species of leguminous plant, i.e., with brown lentils (Lens esculenta), small green kidney beans (Phaseolus vulgaris) and red kidney beans (Phaseolus vulgaris).

After cooking, the lentils have an average diameter of approximately 5-6 mm and an average thickness of approximately 2-3 mm. To reduce them to puree, they are passed through a plate formed with round openings 5 mm in diameter, the sum total of the openings representing approximately 40% of the surface area of the plate. After cooking, the green kidney and red kidney bean seeds have an average length of approximately 14 mm, an average width of approximately 8 mm and an average thickness of approximately 5 mm. To reduce them to puree, they are passed through the same plate as described in Example 1.

The other varied conditions, the intermediate dry matter content of the seeds and the digestion index of the flakes obtained are set out in the following Table 5 where the corresponding values of Example 1 are also shown to facilitate comparison.

| Leguminous plant | White bean | | | Brown lentil | Green kidney | Red kidney |
|---|---|---|---|---|---|---|
| Example No. | 1 | 2 | 3 | 4 | 5 | 6 |
| Soaking time (in 3 parts of water at 20° C.) (h) | 15 | 17 | 17 | 17 | 17 | 17 |
| Water hardness (mmoles Ca/l) | 2 | 3 | 0 | 3 | 3 | 3 |
| Dry matter after soaking (%) | 45 | 44.6 | 44 | 41.2 | 42.8 | n.m.* |
| Cooking | steam | water | steam | steam | steam | steam |
| Cooking time (mins.) | 50 | 45 | 60 | 50 | 50 | 50 |
| Dry matter after cooking (%) | 45 | 36.09 | 44.6 | 41.9 | 43.9 | 40.8 |
| Pressure of steam used to heat drum (bars) | 2.5 | 3 | 3.5 | 3.5 | 3.5 | 3.5 |
| Drying time (s) | 15 | 12 | 12 | 12 | 12 | 12 |
| Digestion index | 17 | 23 | 16 | 29 | 16.5 | 14.6 |

*n.m. = not measured

All the flakes obtained have a residual moisture content of around 5%. Their respective colors are characteristic of the starting seeds of leguminous plants, namely creamy white for the white kidney beans, brown for the lentils, green for the green kidney beans and brown-red for the red kidney beans.

To reconstitute each puree, two parts of water at 80–90° C. are poured onto one part of flakes. The purees obtained are light and each have a pleasant, relatively neutral taste characteristic of the respective starting seeds and a texture reminiscent of that of a cereal gruel.

It can be seen that remarkably low digestion indices are obtained with the flakes of red kidney beans, green kidney beans and white beans. With white beans, it can be seen that cooking in water is less favorable than cooking with steam. Finally, it would seem that a less favorable index is obtained with the lentils than with the beans, although it may still be considered satisfactory.

COMPARISON APPLICATION EXAMPLES

(i) Ingestion by healthy individuals

Food rations are prepared on the basis of the flakes of white beans obtained in accordance with Example 1 having a digestion index of 17, on the one hand, and on the basis of potato flakes having a digestion index of 90, on the other hand. The potato flakes are supplemented with fibers and proteins of white beans so that their global composition is substantially equal to that of the white beans. Each ration is prepared by dispersing a weight of flakes equivalent to 50 g of starch (114 g of white bean flakes) and 2 g of cooking salt in 400 ml of boiling water.

The two types of ration are consumed on an empty stomach by 6 healthy individuals aged 20–25 years in two separate tests. Consumption takes place 5 mins. after preparation of the respective rations. Blood samples are taken from the individuals 30 minutes before consumption, at the moment of consumption and at 30-minute intervals up to 4 hours after consumption. The glucose content and insulin content (IRI) of all the samples taken are determined. The glucose and insulin contents of corresponding samples taken at the time of consumption are subtracted from the values obtained. Curves of the differences thus determined ($\Delta$ glycaemia, mmoles/l; $\Delta$ insulinaemia, mU/l) are plotted as a function of time (t,h).

From these curves are determined, on the one hand, the mean values of the maximum increases in the glycaemia ($\Delta$max glycaemia) and insulinaemia ($\Delta$max insulinaemia) for the six individuals following consumption of the two types of rations and, on the other hand, the mean value of the surface areas ($\overline{F}$) comprised between the curves and the horizontal lines passing through the origin for the first hour (0–1 h), the first two hours (0–2 h) and the third and fourth hour (2–4 h) after consumption. The surface areas for the first hour correspond to the glycaemic index as defined above.

Finally, the mean standard deviation ($\pm$) and the degree of significance of the differences observed between the values obtained after consumption of the two types of rations is determined. This degree of significance is expressed in percent by subtracting from 1 the probability p of nonsignificance (determined by the student's pairs test) and multiplying by one hundred.

The results obtained are set out in the following Table.

| | | Type of ration | | Degree of significance (%) |
|---|---|---|---|---|
| | | Potato flakes | White bean flakes | |
| $\Delta$ glycaemia | | | | |
| $\Delta$max (mmoles/l) | | 2.3 ± 0.4 | 1.2 ± 0.25 | 95 |
| $\overline{F}$ | 0–1 h | 1.4 ± 0.28 | 0.5 ± 0.11 | 98 |
| (mmoles/l · h$^{-1}$ | 0–2 h | 2.1 ± 0.63 | 1.1 ± 0.30 | 98 |
| | 2–4 g | 0.1 ± 0.02 | 1.0 ± 0.30 | 98 |
| $\Delta$ insulinaemia | | | | |
| $\Delta$max (mU/l) | | 52 ± 15 | 20 ± 4.4 | 95 |
| $\overline{F}$ | 0–1 h | 31 ± 6.2 | 8 ± 2.3 | 99 |
| (mU/l · h$^{-1}$ | 0–2 h | 53 ± 11.4 | 24 ± 2.9 | 98 |
| | 2–4 h | 7 ± 2.0 | 24 ± 7 | 95 |

It can be seen that, after consumption of the rations of potato flakes, the glycaemia and insulinaemia of healthy individuals increase rapidly to reach their maximum levels in the first hour, returning to their initial levels after the second hour. By contrast, it can be seen that, after consumption of the rations of the white bean flakes, the glycaemia and insulinaemia of the same healthy individuals reach distinctly lower maximum levels and do not return to their initial levels even after 4 hours.

(ii) Consumption by diabetics

On the one hand, rations of white bean flakes equivalent to 50 g of starch are prepared in the same way as described in (i) above. On the other hand, rations of 100 g of glucose dissolved in 300 ml of water are prepared.

In two separate tests, the two types of rations are given to four individuals (No. 1,2,3,4) suffering from diabetes independent of insulin. The glycaemia and insulinaemia of the individuals are determined at different times ($\Delta t$), namely 30 minutes before consumption, at the moment of consumption and at intervals of 30 minutes up to 3 hours after consumption. The respective values of the glycaemia and insulinaemia at the moment of consumption are subtracted from the values thus obtained. The differences thus determined ($\Delta$ glycaemia, $\Delta$ insulinaemia) are shown in the following Table.

It can be seen that, generally, the glycaemia and insulinaemia of these diabetic individuals reach a maximum level approximately 1 to 2 hours after consumption of the two types of rations. The only exception is the insulinaemia of diabetic No. 3 which remains level.

The maximum values reached differ considerably from one diabetic to another. Accordingly, there would be little point in determining the mean values. However, comparison of the maximum levels reached by the insulinaemia or the glycaemia of one and the same individual after consumption of the two types of rations is striking. Thus, it can be seen that the maximum levels reached after consumption of the glucose rations are considerably higher than the maximum levels reached after consumption of the rations of the white haricot beans for each of the diabetics 1, 2 and 4.

| $\Delta t$ (h) | \multicolumn{4}{c|}{$\Delta$ glycaemia (mmoles/l) individual No.} | \multicolumn{4}{c|}{$\Delta$ insulinaemia (mU/l) individual No.} |
|---|---|---|---|---|---|---|---|---|
| | 1 | 2 | 3 | 4 | 1 | 2 | 3 | 4 |
| \multicolumn{9}{c|}{Glucose} |
| −0.5 | 0.0 | 0.0 | −2.5 | 1.0 | 0 | 6 | 1 | 8 |
| 0 | 0.0 | 0.0 | 0.0 | 0.0 | 0 | 0 | 0 | 0 |
| 0.5 | 4.3 | 0.9 | −0.4 | 4.2 | 17 | 57 | 1 | 31 |
| 1 | 7.2 | 4.2 | 3.3 | 9.0 | 27 | 104 | 2 | 28 |
| 1.5 | 8.6 | 5.3 | 3.8 | 11.9 | 29 | 123 | 2 | 28 |
| 2 | 9.7 | 5.1 | 5.2 | 8.3 | 34 | 144 | 3 | 38 |
| 2.5 | 8.0 | 4.3 | 4.6 | 8.3 | 26 | 144 | 2 | 42 |
| 3 | 3.3 | 3.9 | 5.3 | 9.2 | 20 | 108 | 3 | 37 |
| \multicolumn{9}{c|}{White flakes} |
| −0.5 | 0.0 | 0.0 | 0.0 | 0.0 | 1 | 11 | 0 | 4 |
| 0 | 0.0 | 0.0 | 0.0 | 0.0 | 0 | 0 | 0 | 0 |
| 0.5 | 0.0 | 0.0 | 0.9 | −0.3 | 3 | 4 | 0 | 6 |
| 1 | 0.9 | 0.4 | 2.0 | −0.1 | 10 | 9 | 0 | 10 |
| 1.5 | 1.6 | 0.6 | 2.4 | 0.0 | 13 | 10 | 0 | 15 |
| 2 | 2.1 | 0.4 | 2.7 | 0.2 | 17 | 17 | 1 | 19 |
| 2.5 | 1.8 | 0.6 | 3.0 | −0.1 | 11 | 30 | 1 | 17 |
| 3 | 1.2 | 0.5 | 3.0 | −0.2 | 9 | 18 | 0 | 16 |

We claim:

1. A process for producing a dehydrated puree having a digestion index of less than 30 from seeds of leguminous plants containing starch comprising rehydrating dry seeds of leguminous plants while avoiding gelatinization of the starch, cooking the rehydrated seeds in saturated steam at atmospheric pressure for gelatinizing the starch, disintegrating the cooked seeds without shearing and twisting forces for reducing the cooked seeds to a puree and then drying the puree for obtaining particles of the seeds having substantially intact cells.

2. A process as claimed in claim 1 wherein the cooked seeds are disintegrated by being passed through openings in a plate at a speed of 2 cm/s to 20 cm/s, the openings having dimensions of which the smallest dimension is between a smallest mean dimension of the rehydrated seeds and a largest means dimension of the rehydrated seeds and wherein the puree is dried as a film on a drum surface and then reduced to flakes for maintaining the substantially intact cells.

3. A process for producing a dehydrated puree having a digestion index of less than 30 from starch-containing seeds of leguminous plants comprising:
   rehydrating dry starch-containing seeds of leguminous plants by soaking the seeds while avoiding gelatinization of the starch;
   cooking the rehydrated seeds in saturated steam at atmospheric pressure for gelatinizing the starch;
   passing the cooked seeds through openings in a plate at a speed of from 2 cm/s to 20 cm/s for reducing the cooked seeds to a puree, the openings having dimensions of which the smallest dimension is between a smallest means dimension of the rehydrated seeds and a largest mean dimension of the rehydrated seeds;
   distributing the puree as a film on a heated drum surface, drying the puree on the drum surface and then removing dried puree from the drum surface; and
   reducing the dried puree to flakes.

4. A process as claimed in claim 3 wherein the seeds are selected from the group consisting of beans and lentils.

5. A process as claimed in claim 3 wherein the dry seeds are rehydrated by soaking the seeds in water for from 0.5 h to 24 h at a temperature of from 20° C. to 65° C.

6. A process as claimed in claim 5 wherein the seeds are soaked for 10 h to 24 h at ambient temperature in water having a Ca content not exceeding 3 mmoles/l.

7. A process as claimed in claim 3 wherein the seeds are cooked for 40 mins to 60 mins.

8. A process as claimed in claim 3 further comprising draining water from the seeds after cooking.

9. A process as claimed in claim 3 wherein the drum is heated with steam under a pressure of 2 bars to 8 bars for heating the surface of the drum and heating the puree on the surface of the drum for 8 s to 25 s.

10. A process according to claim 9 wherein the dried puree is reduced to flakes having a surface area of at least 4 mm².

11. A process as claimed in claim 9 wherein the surface of the drum is heated with steam under a pressure of from 4 to 8 bars and further comprising spraying water onto the drum ahead of a zone in which the puree is distributed over the drum for having a surface temperature of the drum of from 110° C. to 115° C.

12. A process according to claim 11 wherein the dried puree is reduced to flakes having a surface area of at least 4 mm².

13. A process for producing a dehydrated puree having a digestion index of less than 30 form starch-containing seeds of leguminous plants comprising:
   soaking dry starch-containing seeds of leguminous plants in water for from 0.5 h to 24 h at a temperature of from 20° C. to 65° C.;

cooking the rehydrated seeds in saturated steam at atmospheric pressure for from 40 mins to 60 mins;

passing the cooked seeds through openings in a plate at a speed of from 2 cm/s to 20 cm/s for reducing the cooked seeds to a puree, the openings having dimensions of which the smallest dimension is between a smallest mean dimension of the rehydrated seeds and a largest means dimension of the rehydrated seeds;

distributing the puree as a film on a heated drum surface, drying the puree on the drum surface and then removing dried puree from the drum surface; and reducing the dried puree to flakes.

14. A process as claimed in claim 13 wherein the seeds are soaked in water having a Ca content not exceeding 3 mmoles/1.

15. The product of the process of claim 1.
16. The product of the process of claim 3.
17. The product of the process of claim 4.
18. The product of the process of claim 9.
19. The product of the process of claim 10.
20. The product of the process of claim 13.
21. The product of the process of claim 14.
22. A dehydrated puree of leguminous plant seeds having a digestion index below 30.
23. A puree as claimed in claim 1, wherein the leguminous seeds are selected from the group consisting of beans and lentils.
24. A puree as claimed in claim 1, wherein the puree is in a form selected from the group consisting of granules and flakes.

* * * * *

UNITED STATES PATENT AND TRADEMARK OFFICE
CERTIFICATE OF CORRECTION

PATENT NO. : 4,853,248

DATED : August 1, 1989

INVENTOR(S) : Pierre WÜRSCH, et al.

It is certified that error appears in the above-identified patent and that said Letters Patent is hereby corrected as shown below:

Claim 2, column 14, line 9, "largest means" should be --largest mean--.

Claim 13, column 15, the 8th line of the claim, "means" should be --mean--.

Signed and Sealed this

Nineteenth Day of June, 1990

Attest:

HARRY F. MANBECK, JR.

*Attesting Officer*      *Commissioner of Patents and Trademarks*